April 19, 1960

J. A. STIEBER ET AL 2,932,907

MAP PROJECTIONS DEMONSTRATOR

Filed Jan. 16, 1956

INVENTORS
JOSEPH A. STIEBER
JOHN B. WELDON
BY

*W. R. Maltby*

ATTORNEY

April 19, 1960 J. A. STIEBER ET AL 2,932,907
MAP PROJECTIONS DEMONSTRATOR
Filed Jan. 16, 1956 9 Sheets-Sheet 2

INVENTORS
JOSEPH A. STIEBER
JOHN B. WELDON
BY
W.R. Maltby
ATTORNEY

April 19, 1960

J. A. STIEBER ET AL 2,932,907

MAP PROJECTIONS DEMONSTRATOR

Filed Jan. 16, 1956

INVENTORS
JOSEPH A. STIEBER
JOHN B. WELDON
BY

*WR Maltby*

ATTORNEY

April 19, 1960 J. A. STIEBER ET AL 2,932,907
MAP PROJECTIONS DEMONSTRATOR
Filed Jan. 16, 1956 9 Sheets-Sheet 5

INVENTORS
JOSEPH A. STIEBER
JOHN B. WELDON
BY
W.R. Maltby
ATTORNEY

INVENTORS
JOSEPH A. STIEBER
JOHN B. WELDON

April 19, 1960

J. A. STIEBER ET AL 2,932,907

MAP PROJECTIONS DEMONSTRATOR

Filed Jan. 16, 1956

INVENTORS
JOSEPH A. STIEBER
JOHN B. WELDON

BY

*W R Maltby*

ATTORNEY

April 19, 1960   J. A. STIEBER ET AL   2,932,907
MAP PROJECTIONS DEMONSTRATOR

Filed Jan. 16, 1956   9 Sheets-Sheet 8

INVENTORS
JOSEPH A. STIEBER
JOHN B. WELDON
BY
W.R. Maltby
ATTORNEY

April 19, 1960 J. A. STIEBER ET AL 2,932,907
MAP PROJECTIONS DEMONSTRATOR
Filed Jan. 16, 1956 9 Sheets-Sheet 9

INVENTORS
JOSEPH A. STIEBER
JOHN B. WELDON
BY
ATTORNEY

United States Patent Office 2,932,907
Patented Apr. 19, 1960

2,932,907

MAP PROJECTIONS DEMONSTRATOR

Joseph A. Stieber, Valley Stream, and John B. Weldon, Levittown, N.Y.

Application January 16, 1956, Serial No. 559,494

11 Claims. (Cl. 35—46)

(Granted under Title 35, U.S. Code (1952), sec. 266)

The invention described herein may be manufactured and used by or for the Government of the United States of America for governmental purposes without the payment of any royalties thereon or therefor.

This invention relates to globes and in particular to improvements in means for providing information on the globes to be used in map projection demonstrations.

Transparent globes for teaching and training purposes have long been available, but are not satisfactory for efficient use. Some existing devices are constructed of polystyrene pressure molded material, but are inadequate due to poor coloring and poorly formed bases. Interference with clarity of design and utility thereof is due to ribs formed on the exterior of the globe. The materials used also discolored with age and rendered the globe useless in time. These devices were not suitable for projection because of limited and malformed parts. As a result, a great deal of breakage would occur. Further, provision for addition or removal of elements to illustrate the subject being taught was inadequate and as a result only a few, simple problems could be demonstrated with each globe. It was also conventional to paint geographical data on the exterior of the globe, and it was not possible to directly mark the areas being studied on the globe, without damaging the structure.

The present invention overcomes the inadequacies of the prior art by permanently providing geographical information on the interior or exterior surfaces of the globe as well as by permitting units to be interchangeably mounted thereon for illustration of educational information.

Another important object is to provide a training aid in the visual illustration of a principle, or subject, and is to be used in schools or other educational and training areas.

Another object is to provide a transparent globe able to project map information onto a suitable surface or screen.

Still another object is to provide a globe with a surface able to accept directly temporary marking means so that the demonstration could be readily varied without requiring substitution of several parts.

Yet another object is to provide a device that is readily assembled and aligned without requiring the use of projecting elements.

And still another object is to provide a new method of applying information to the external and interior surface of a hemispherically formed material, whereby greater transparency and better projection is possible.

Another object is to design a new base for the globe of the invention which enables the globe to be separately mounted on the base and provides a greater area visible at the lower surface thereof.

Another object of the invention is to use a new plastic material whereby the colors applied to this material are clearly and vividly brought out.

Still another object is to provide a novel method and structure for demonstrating secant cone projection.

And another object is to provide a polyconic demonstration method and structure by means of nested cones.

Another object is to provide a cylinder used in transverse cylinder projection which will be structurally strong and can withstand considerable strain without chipping or breaking.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
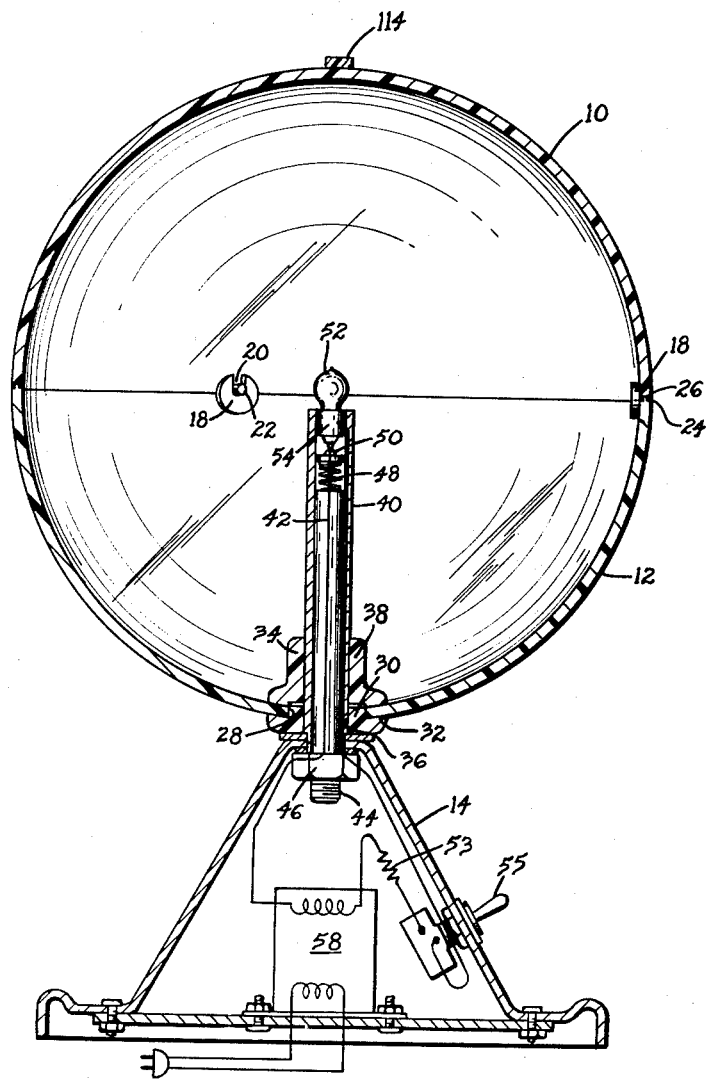
Fig. 1 is a vertical section of a globe illustrating the aligning means and the mounting base therefor.

Existing methods of forming the hemispherical members of the globes were unsatisfactory because of poor techniques and inadequate versatility. To overcome these limiting features, a new process for forming globes was developed.

In the instant process, a sheet of clear Plexiglas is heated and is formed into a hemisphere of the desired size. At this time an outline of the map information desired is drawn on the deformed Plexiglas sheet, after which it is again reheated and allowed to flatten into its original planar shape. Such step is possible because of the memory quality of the Plexiglas used which resumes its original form. The map information on the flat transparent sheet of plastic becomes distorted when it returns to the original form. A drawing for the silk screen stencil is then made. Many known procedures are used to provide the silk screen information, as for example, by photographic reproduction, or by means of an etching process to cut out the silk screen stencil.

The map information is now ready for application to a globe-half. The silk screen stencil is placed on a flat plastic matrix of Plexiglas or similarly suitable material, either on the exterior or interior surface, and ink in the color selected, is applied. The ink is applied in excess. The plastic material with an excess of ink is placed in an oven and is heated to a temperature of from 250°–350° F. The plastic is softened, and impregnation of the ink into the plastic material takes place. While still warm and in pliable condition, a vacuum is applied to the oven and the plastic material is deformed to assume the shape of a hemisphere. Additional impregnation of the ink into the plastic continues to occur. A hemispherical plug, slightly smaller in diameter than the desired shape of the finished hemispherical section of the globe, is then placed over the outlet of the hemispherical forming oven. The material is allowed to harden and the vacuum is then released. The hemispherical plastic sheet with the map information impregnated therein provides a correctly scaled map formed about the exterior surface of the hemispherical plug member. The plug and plastic material are cooled uniformly, after which the plug and plastic map are removed from the oven, and the plastic hemisphere, now of the correct diameter, is separated from the plug form. Any excess ink is carefully wiped away after the oven is cooled. The ink that has permeated into the plastic hemisphere forming the map information can now be projected onto a screen or similar device.

This process results in vivid colors permanently set into the material itself, rather than painted thereon, as was true of prior methods. Fading, or discoloration no longer occurs. Further, the outer surface is clear and information may be drawn with a grease pencil on the plastic outer surface without danger of damage to the globe, as would be the case where a map is painted on the external surface of the globe. The penciled information is readily erased, and the globe is ready for use in another problem.

An additional advantage resulting from the plug and vacuum method described above is that a perfectly formed hemisphere is now made possible. Usual methods of forming hemispherical globe halves resulted in the rims of the hemisphere halves being slightly flattened with a prominent bulge occurring at a few inches above the rim, thereby failing to provide the perfectly rounded sphere illustrated in Fig. 1.

Fig. 1 is a section taken longitudinally through a globe of the invention and discloses two perfectly formed hemispheres 10 and 12 mounted on a conic base or pedestal 14. In order to quickly align the sphere halves, a disc-like button 18 is cemented within a rim portion of hemisphere 12, and having a portion of said disc extended above the periphery of the rim. Disc 18 contains a U-shaped slot 20 in the extended portion and is adapted to receive therethrough aligning pin 22 extending from the interior of hemisphere 10. Hemispheres 10 and 12 are rapidly aligned by simply resting pins 22 in slots 20. Where precision alignment is required, circular ridges 24, seated in circular grooves 26 insure a smooth, continuous outer surface.

Lower hemisphere 12 contains an enlarged opening 28 through which rubber bushing 30 extends, resting by means of annular shoulder 32 against the outer surface of hemisphere 12. Guide bushing 34 is cemented within hemisphere 12 in opposed relation to bushing 30. The bushing members are axially bored at 36 and 38 respectively and receive therethrough a hollow sleeve member 40. Sleeve member 40 extends vertically into the interior of the globe to a point adjacent the center thereof. Sleeve member 40 depends a short distance below bushing 30 into base member 14. Conducting rod 42 extends partially into sleeve member 40 from a distance beyond the lower end of sleeve 40. Rod 40 is functionally held in position and is threaded at 44 to retain locking nut 46 thereon. Contact spring 48 engages the upper end of rod 42 and resiliently urges contact 48 into engagement with a lamp 52 mounted in socket 54.

Switch 55 is connected to transformer 58 in base member 14 and closes the circuit to energize lamp 52. Resistor 53 has been added to prolong the life of lamp 52.

Bushings 30 and 34 securely retain the rod, but allow sliding movement along the exterior surface of sleeve member 40. When it is necessary to demonstrate polar stereographic projection, the globe is simply slid along sleeve 40 until free. Spacing post 56 is then mounted on sleeve 40, as is shown in Fig. 2, and the globe again remounted, to rest in the position illustrated in Fig. 2. Lamp 52 is now located adjacent the lower polar region.

While the globe is adaptable to many uses, it is especially advantageous as a method of projecting the world sphere in a visual simulation of the shape of the flat charts and maps of the cartographer.

While the projections demonstrated in the figures visually represent the mathematically calculated flat map projections of the cartographer, they are for training purposes primarily, rather than as reproductions of mathematically accurate maps.

Figure 4:
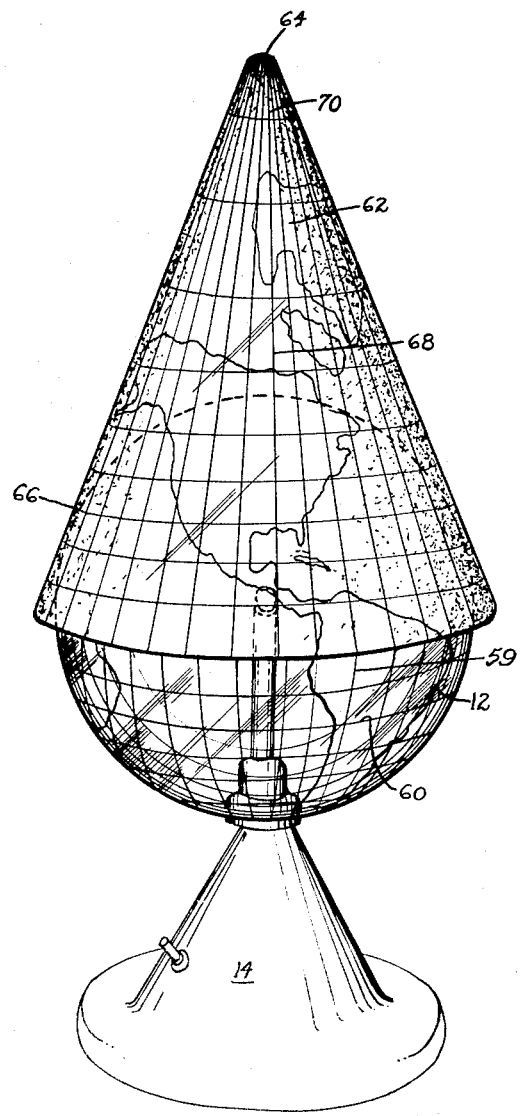
Fig. 4 is a perspective view of a simple, conic projection.
Figure 5:
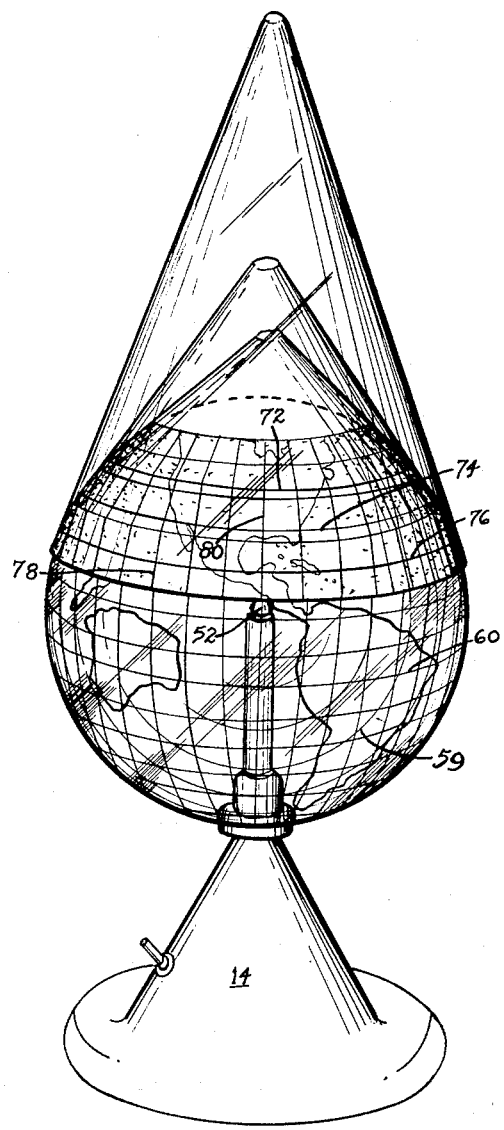
Fig. 5 is a perspective view of a polyconic demonstrator.

The Plexiglas globe is provided with meridians 59 and parallels 60 preferably marked at ten degree intervals, as is shown in Figs. 4 and 5. The device relies on a prefocused point light source, lamp 52, to serve as a projector in order to illustrate how map information is transferred from a globe to a developable surface. A series of translucent Plexiglas attachments serve as receiving screens.

To present the curved surface of the earth on a flat map is not difficult, provided the areas under consideration are small. The mapping of countries, continents or the whole earth by the cartographer is a different matter, and requires some kind of projection.

The geometric straight line is still the shortest distance between two points. Meaningful distances are measured along curves, the arcs of great circles. Knowing the size of the earth, globes and maps are made to true scale. On a globe the scale is constant and is an accurate model of the earth. It is the only possible medium of showing all geographical relations truly. A scale given on a flat map cannot be true everywhere. But globes have their practical drawbacks as they are necessarily limited to scale. Cost and size would be prohibitive, if small areas were to be enlarged. These limitations gave rise to cartography, the making of maps on a flat surface.

The method used to "stretch" or lay out a flat map is by projection of the map—the system by which the gridwork of parallels and meridians is laid out on a piece of paper to represent latitude and longitude. This decides the representation of area as well as shape, distance and direction on the finished map.

The projections illustrated in Figs. 4 to 11 assist in visually understanding the cartographer's projections as laid out by graphics and mathematics. The type of map projection chosen depends on how a map is to be used. By varying the grid systems, the origin of light and the position of the eye, the trainee is shown non-mathematically how each projection is derived.

Fig. 4 illustrates a simple conic projection, sealed at the top for additional strength, with the globe's surface projected on a tangent cone 62. Cone 62 is placed over the northern hemisphere of the globe, with the apex 64 of the cone directly over the North Pole. The projection of the globe's surface, as is evident from the figure, is upon a tangent cone. Cone 62 is tangent to the earth's surface at the middle parallel of the region mapped, the line of contact 66 between the cone and globe being known as a standard parallel. This visual simulation of the cartographer's flat map shows meridians 68 as straight lines radiating from the poles and parallels 70 as arcs of concentric circles centered on the poles. The course lines closely approach great circles and the scale on the map is the same as that on the globe at the standard parallel.

Figure 6:
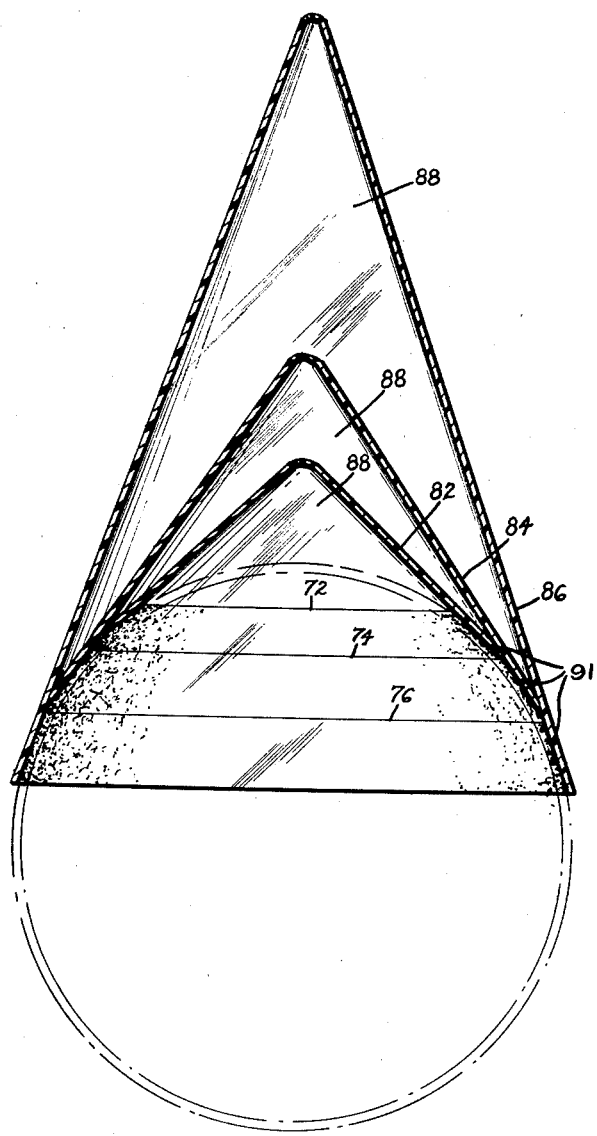
Fig. 6 is a vertical section of the polyconic demonstrator of Fig. 5.

The straight line meridians of the conic projection are made to look like curved lines when the polyconic projection of Figs. 5 and 6 are used. In actual cartography, many cones are imagined tangent to the sphere. Each parallel of latitude, (shown on the map as 72, 74 and 76) is developed with its own radius, as if it were the line of contact of a tangent cone. Since each parallel is a circular arc struck with its own radius, as the radii become shorter and the curvature greater, these arcs would depart more and more from one another, away from the central meridian. The arcs representing parallels 72, 74 and 76 are divided truly to scale points of intersection with meridians 78 spaced along them. The central meridian 80 is drawn as a straight line, all other meridians are drawn as smooth curves through these points.

Polyconic projector 90 comprises cones 82, 84 and 86, each tangent to the globe along the central meridians of the zones being mapped. The upper section 88 of each cone is transparent, while the portion 91 tangent to the sphere is translucent and is the screen upon which the map information is projected.

The polyconic projection is used primarily for large scale topographic sheets and is ideal for mapping a long strip of small longitudinal extent. There is no distortion along the central meridians, which appear as a straight line, and shows land mass shapes accurately with relatively little distortion and also provides a true scale along the line of any parallel on the map.

The globe of the invention is adapted to illustrate secant cone projection used to a great extent in air navigation maps and for maps with predominating east-west extent. In this projection, two standard parallels are used. The meridians 92 are straight lines, so that all parallels 94 are arcs of concentric circles struck from the intersection point of the meridians, thus maintaining the right-angle intersections.

Figure 8:
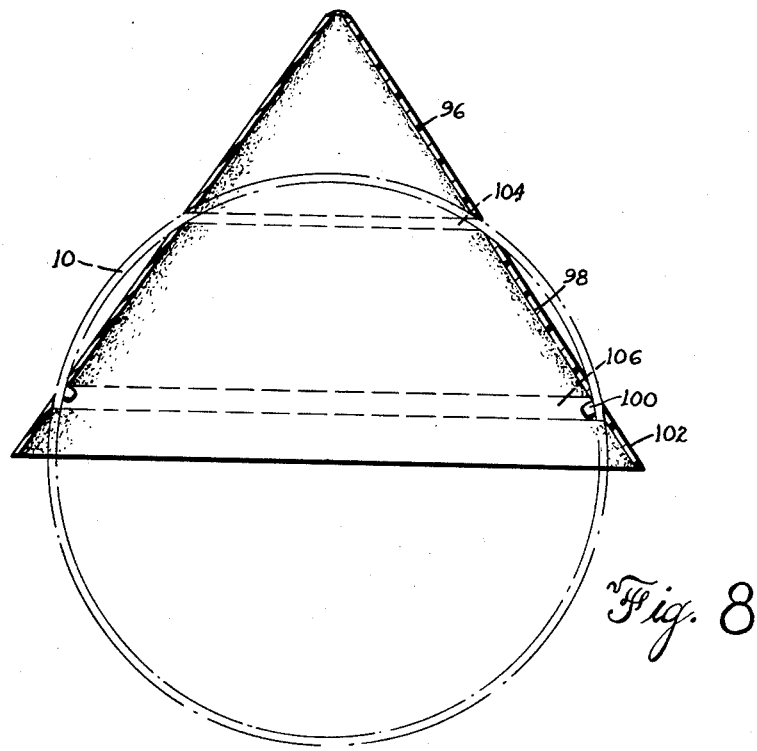
Fig. 8 is a vertical section of the secant cone projector of Fig. 7.
Figure 7:
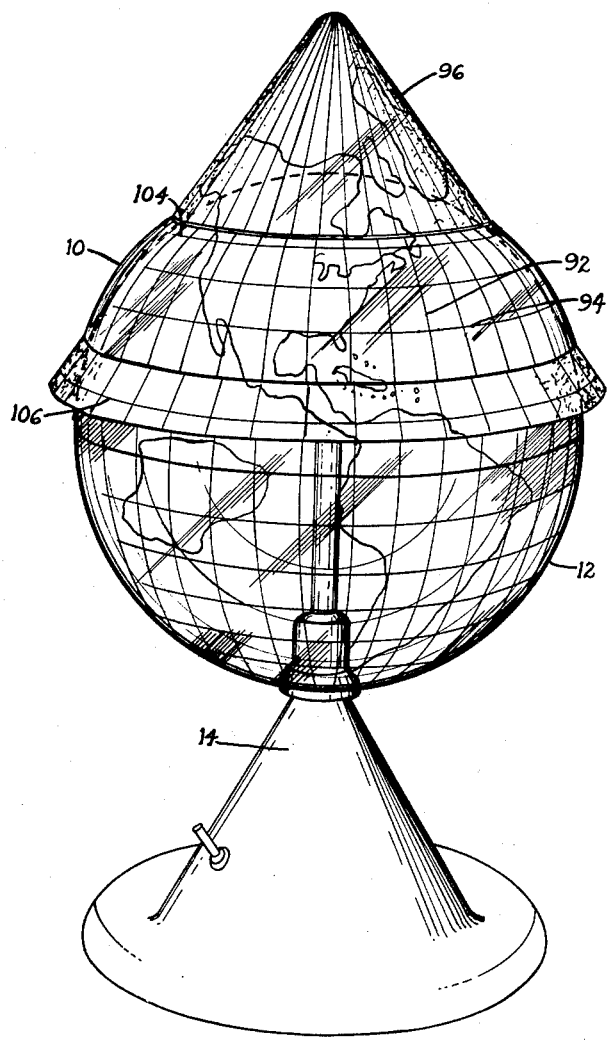
Fig. 7 is a perspective view of a secant cone projection demonstrating means.

In Figs. 7 and 8, part of the earth's surface is projected into a cone which cuts the earth at two standard parallels. To effect this projection, a simple cone 96 is mounted on the globe, a conical segment 98 is mounted within the globe on suitable lugs 100, and a flared conical segment 102 is retained on the globe below the internal conical segment portion. In cross-section, elements 96, 98 and 102 combine to form a simple cone with the cone cutting through the globe. The conical segment 98 has the map image imprinted on its outer surface. This map image is distorted to represent a projection from a spherical surface to a conic surface. The portion of the hemisphere 10 directly over the conical segment 98 is transparent to permit viewing of the image on the conical segment 98.

Only the part lying between the standard parallels 104 and 106 and a short distance on either side is used for the map. All sections, however, are translucent with primary projection taking place between the standard parallels to visually demonstrate the map resulting from the cartographer's mathematic computations. A large portion of the earth's surface at a distance from the equator is projected by this method.

Figure 9:
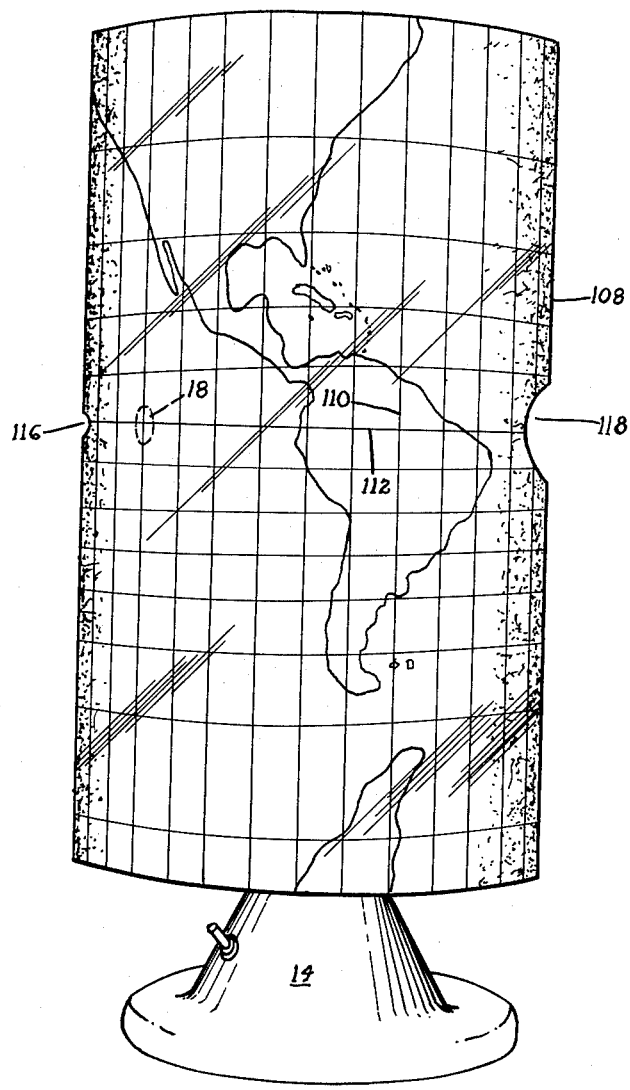
Fig. 9 is a perspective view of a vertically mounted cylinder.
Figure 10:
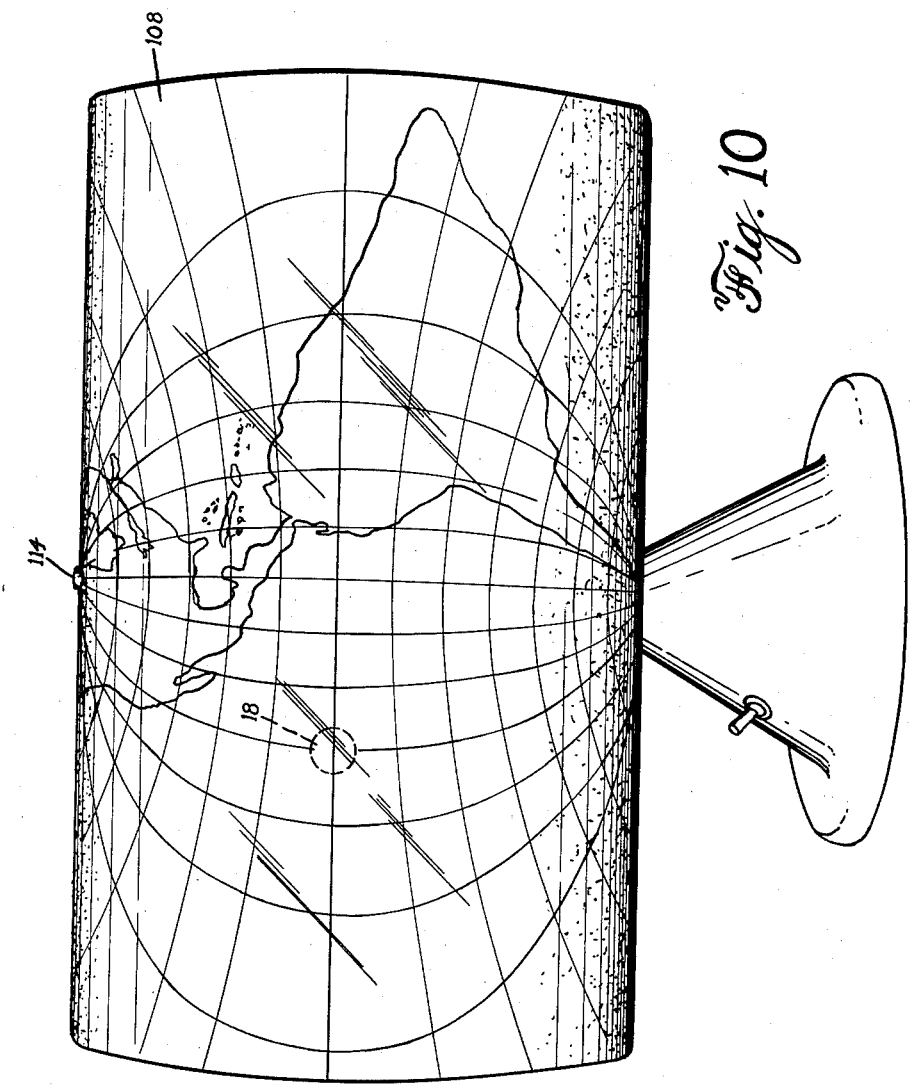
Fig. 10 is a perspective view of the cylinder of Fig. 9, but mounted in a transverse position.

Figs. 9 and 10 present visually mercator and transverse mercator projections. In Fig. 9, cylinder 108 is translucent and is open at each end. By eliminating the beaded edges of prior cylinders, it has been found that splitting of the cylinder is avoided. Cylindrical projections are also employed as a tool by the cartographer. In cylindrical projections the relationship between the length of the degree on any latitude and the length of a degree of longitude is basic. Both parallels and meridians appear as straight lines, crossing each other at right angles.

Cylinder 108 is positioned over the globe so that it is parallel to the earth's polar axis. This simulation presents part of the earth's surface as represented by mathematical development upon a cylinder tangent to the equator. In it, the distance between consecutive parallels expands with the increase in latitude toward the poles. The mercator projection map is especially useful to navigators.

As is apparent from Fig. 9, meridian lines 110 and parallels of latitude 112 become straight lines, crossing at right angles. Thus, a compass course between any two points is shown as a straight line, thereby showing true compass direction. Mercator projection maps preserve correct angles and represent a true conformal projection. Thus, any small island or country is shown in its true shape and is especially good when used in equatorial projections.

For practical purposes, the earth is a sphere. All parts of it are assumed to be alike and the grid of parallels and meridians is applied for convenience. If a sphere just fits into a cylinder, it makes no difference how it is turned. The fit, or line of tangency, can be any great circle. Thus, an area along any great circle can be treated as an equator and the projection is plotted upon a cylinder tangent to that line.

This principle is visually illustrated by the transverse mercator projection of Fig. 10. Cylinder 108 is placed in transverse position by first removing the globe from base 14 and then having the globe inserted inside the cylinder so that the globe's equator is parallel to the axis of the cylinder. Button 114 (see Figs. 1 and 10) is inserted through aperture 116 (see Fig. 9) and the whole assembly is returned to base 14 by inserting lamp 52 and sleeve 40 through large opening 118 on the cylinder. The projection is a representation in which straight lines, on either side of the axis of the chart, are approximately great circles. The north and south dimensions are very accurate.

For convenience in demonstration, the globe is mounted on pedestal 14 so that the transverse mercator is at right angles to the mercator of Fig. 9. Obviously, the line of tangency of the cylinder may be at any great circle.

Figure 11:
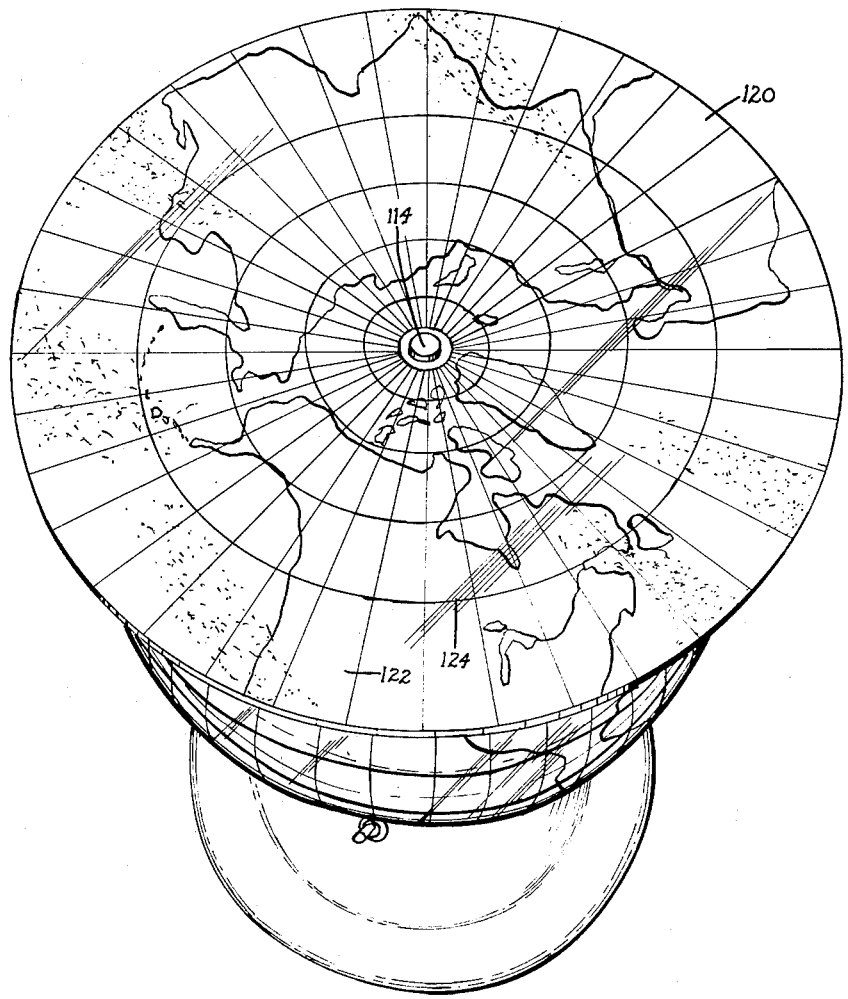
Fig. 11 is a perspective view of a disc mounted at the North Pole of a globe.

The cartographer is able to represent the earth's surface as a plane surface. If the cone is altered to fit the sphere at higher and higher altitudes the elements become flatter until the cone becomes a plane touching the sphere at a single point. This is illustrated by means of translucent disc 120, mounted on button 114 at the north pole of Fig. 11. Such projection visually presents disc 120 tangent to the globe and is known an gnomonic projection. The projection of the earth is as if seen from its center. When a disc is tangent at one point, distortion increases with distance from that point. Meridians 122 appear as straight lines converging towards the point and parallels of latitude appear as non-parallel curved lines, unless the point of tangency is at the pole, as illustrated in Fig. 11. Much use is made of this projection for great circle sailing charts and plotting of radio bearings. It is also very useful for aviation in long range flying and transoceanic navigation. This projection is widely used in conjunction with the mercator chart.

Figure 2:
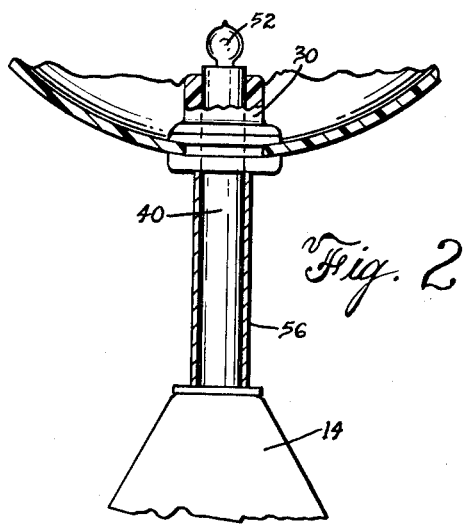
Fig. 2 is an enlarged detail of the base illustrating the adjustment means to raise the globe.
Figure 3:
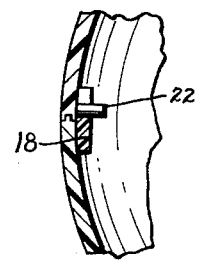
Fig. 3 is a fragmentary section of the globe illustrating the alignment means for the hemispherical sections.

The gnomonic projection shows all circles as straight lines. In this projection the shortest distance between two points is a straight line. In all of the illustrated map projections above, the source of illumination is at the center of the earth. In the polar stereographic projection, the point light source emanates from the opposite pole. In this projection, disc 120 remains in the position of Fig. 11. The globe is removed from pedestal 14, spacing post 56 is slid over rod 40, and the globe replaced on the pedestal, as is shown in Fig. 2. Lamp 52 is now adjacent the south pole.

A novel process providing a globe adapted to project information in map demonstrations has been devised. The invention is not limited to the described method, but is capable of being carried out by other methods. For example, after the ink has been applied and the stencil heated, the plastic can be cooled and any excess ink be removed. The vacuum step would then follow.

In addition, means to provide the visual demonstration for the mathematical calculations have been devised in the above-described cones and cylinders.

Obviously many modifications and variations of the present invention are possible in the light of the above teachings. It is therefore to be understood that within the scope of the appended claims the invention may be practised otherwise than as specifically described.

What is claimed is:

1. A map projections demonstrator comprising a transparent globe having map information thereon, a light source in said globe, and translucent means mounted on said globe tangent thereto, whereby the map information is projected onto the translucent means to provide the desired projection demonstration.

2. The combination of claim 1 wherein said translucent means is a cone.

3. The combination of claim 1 wherein said translucent means is a cylinder.

4. The combination of claim 1 wherein said translucent means is a disc.

5. A map projections demonstrator comprising a pair of plastic hemispheres, means coupling said hemispheres together, silk screen map information on the interior surfaces of said hemispheres, impregnated permanent coloring in said hemispheres, and means including a translucent disc mounted on one of said hemispheres at a point tangent thereto.

6. A map projections demonstrator comprising a pair of plastic hemispheres, means coupling said hemispheres together, silk screen map information on the interior surfaces of said hemispheres, impregnated permanent coloring in said hemispheres, and a translucent cylinder removably retained on said hemispheres.

7. The combination of claim 6 wherein said cylinder is open at opposed ends and an aperture is in said cylinder for transverse mounting.

8. A map projections demonstrator comprising a pair of Plexiglas hemispheres, means coupling said Plexiglas hemispheres together, silk screen map information on the interior surfaces of said hemispheres, impregnated permanent coloring on the exterior surfaces of said hemispheres, and a polyconic member removably mounted on said hemispheres, said polyconic member comprising three individual conic sections cemented inside one another to form one piece.

9. A map projections demonstrator comprising a pair of plastic hemispheres, map information on the interior surfaces of said hemispheres, disc coupling means retained on the interior surface of one hemisphere adjacent a rim and securing the hemispheres together, a slot in said disc coupling means and a transverse pin secured to the other hemisphere and seating in said slot, whereby the hemispheres are rapidly aligned and coupled together.

10. In combination with a map projection system, means coupling a pair of Plexiglas hemispheres together, an opening in one of said hemispheres, a conical base having an opening therein aligned with said hemisphere opening, a vertical sleeve member extending through said aligned openings, lamp means retained in said sleeve member and energizing means in said base connected to said lamp means, said coupling means comprising a disc mounted on one of said hemispheres, a slot in said disc, a transverse pin mounted in the other hemisphere seated in said slot, and tongue and groove means in said hemispheres, whereby they are rapidly aligned and coupled together.

11. A map projection demonstrator comprising a pair of plastic hemispheres, means coupling said hemispheres together, means including a secant cone projection assembly removably mounted on one of said hemispheres, said secant cone projection assembly comprising a simple cone mounted on the exterior of said hemisphere, a conical segment mounted within said hemisphere and a flared conical segment mounted on the hemisphere beneath the conical segment, whereby the illusion of a cone cutting through the globe is provided, silk screen map information affixed to the interior surfaces of said hemispheres except for a transparent section over said internally mounted conical segment, permanent coloring impregnated in said hemispheres, and map information coherent with said hemisphere map information affixed to the external surface of said internally mounted conical segment.

References Cited in the file of this patent

UNITED STATES PATENTS

| | | |
|---|---|---|
| 887,740 | Phillips | May 12, 1908 |
| 2,027,156 | Dupler | Jan. 7, 1936 |
| 2,149,213 | Fislar | Feb. 28, 1939 |
| 2,301,526 | Dupler | Nov. 10, 1942 |
| 2,491,386 | Miller et al. | Dec. 13, 1949 |
| 2,510,213 | Ekstedt et al. | June 6, 1950 |
| 2,515,400 | Dupler | July 18, 1950 |
| 2,515,401 | Dupler | July 18, 1950 |
| 2,622,991 | Sturm | Dec. 23, 1952 |
| 2,656,634 | Varner | Oct. 27, 1953 |
| 2,704,905 | Ernst | Mar. 29, 1955 |
| 2,763,183 | Liversidge | Sept. 18, 1956 |

OTHER REFERENCES

"Earth Sits For Her Portrait" (Faye), published in Science Illustrated, Sept. 1948, pages 34–47.

"Maps for a Shrinking World," Popular Mechanics, Feb. 1946, pages 50–53.

Johnson: "Mathematical Geography," pages 218–223, American Book Co., 1907.